(12) United States Patent
Ritter

(10) Patent No.: US 10,779,474 B2
(45) Date of Patent: Sep. 22, 2020

(54) PERFORATED COVERS FOR THRESHING CONCAVES

(71) Applicant: CNH Industrial America LLC, New Holland, PA (US)

(72) Inventor: Christoph Georg Ritter, Sorocaba (BR)

(73) Assignee: CNH Industrial America LLC, New Holland, PA (US)

( * ) Notice: Subject to any disclaimer, the term of this patent is extended or adjusted under 35 U.S.C. 154(b) by 163 days.

(21) Appl. No.: 15/787,338

(22) Filed: Oct. 18, 2017

(65) Prior Publication Data

US 2018/0103588 A1    Apr. 19, 2018

(30) Foreign Application Priority Data

Oct. 19, 2016  (BR) .......................... 1020160244200

(51) Int. Cl.
*A01F 12/26*    (2006.01)
*A01F 12/28*    (2006.01)

(52) U.S. Cl.
CPC .............. *A01F 12/26* (2013.01); *A01F 12/28* (2013.01)

(58) Field of Classification Search
CPC .......... A01F 12/26; A01F 12/28; A01F 12/24; A01F 12/181; A01F 12/44; A01F 7/067; A01D 41/12
See application file for complete search history.

(56) References Cited

U.S. PATENT DOCUMENTS

| 2,305,964 A | 12/1942 | Harrison et al. |
| 2,771,077 A | 11/1956 | Karlsson et al. |
| 2,833,288 A | 5/1958 | Scranton |
| 3,092,115 A * | 6/1963 | Morgan .................. A01F 12/18 29/891 |
| 3,568,682 A * | 3/1971 | Knapp ..................... A01F 12/24 460/108 |
| 4,499,908 A | 2/1985 | Niehaus |
| 6,119,442 A * | 9/2000 | Hale .................. A01D 41/1277 56/10.2 H |

(Continued)

FOREIGN PATENT DOCUMENTS

| BE | 392802 A | 1/1933 |
| BR | 102015006974 A2 | 12/2016 |

(Continued)

OTHER PUBLICATIONS

Extended European Search Report and Written Opinion for EP Application No. 17197021.3 dated Feb. 21, 2018 (6 pages).

*Primary Examiner* — Arpad Fabian-Kovacs

(74) *Attorney, Agent, or Firm* — Peter Zacharias; Patrick Sheldrake

(57) ABSTRACT

A removable cover plate to be used in a threshing module of an agricultural machine, e.g., a grain harvester. The removable cover plate provides a uniform and homogeneous distribution of grains onto a cleaning and harvesting system of the machine. The removable cover plate is designed to be applied to at least one part of a concave of the cleaning and harvesting system of the machine. The cleaning and harvesting system includes at least one rotor and a least one concave mounted around the rotor, to which is attached and installed a removable structure that has a material retention surface, in which there are provided openings to limit grains and/or MOG passage.

15 Claims, 5 Drawing Sheets

(56) References Cited

U.S. PATENT DOCUMENTS

| | | | | |
|---|---|---|---|---|
| 6,358,142 | B1* | 3/2002 | Imel | A01F 12/26 460/107 |
| 6,443,835 | B1* | 9/2002 | Imel | A01F 12/26 460/107 |
| 6,447,394 | B1* | 9/2002 | Gryspeerdt | A01D 41/1271 460/109 |
| 7,137,882 | B2* | 11/2006 | Holtmann | A01F 12/185 460/75 |
| 8,133,100 | B2* | 3/2012 | Regier | A01F 12/181 460/109 |
| 8,133,101 | B2* | 3/2012 | Regier | A01F 12/181 460/109 |
| 8,636,568 | B1 | 1/2014 | Farley | |
| 9,723,792 | B1* | 8/2017 | Kile | A01D 41/12 |
| 10,045,487 | B1* | 8/2018 | Robertson | A01F 12/24 |
| 2007/0178951 | A1* | 8/2007 | Voss | A01F 12/28 460/109 |
| 2014/0171164 | A1 | 6/2014 | Foster et al. | |
| 2016/0262310 | A1* | 9/2016 | Bojsen | A01F 7/067 |
| 2018/0368325 | A1* | 12/2018 | Koudela | A01F 12/24 |
| 2019/0037773 | A1* | 2/2019 | Theisen | A01F 7/062 |
| 2019/0166767 | A1* | 6/2019 | Robertson | A01F 12/24 |
| 2019/0166768 | A1* | 6/2019 | Robertson | A01F 12/184 |

FOREIGN PATENT DOCUMENTS

| | | | |
|---|---|---|---|
| DE | 1006196 B | 4/1957 | |
| EP | 1159867 A1 * | 12/2001 | A01F 12/26 |
| EP | 2537404 A1 | 12/2012 | |
| FR | 2615686 A1 | 12/1988 | |
| FR | 2621216 A1 | 4/1989 | |
| GB | 1352617 A | 5/1974 | |
| WO | 0214609 A1 | 4/2001 | |
| WO | WO-0124609 A1 * | 4/2001 | A01F 12/26 |

* cited by examiner

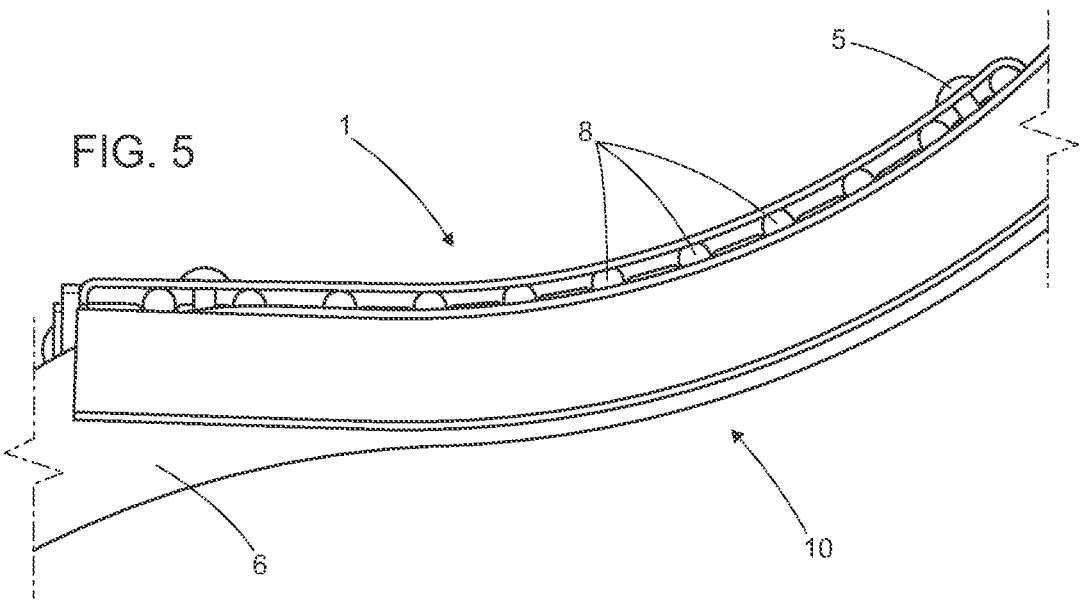
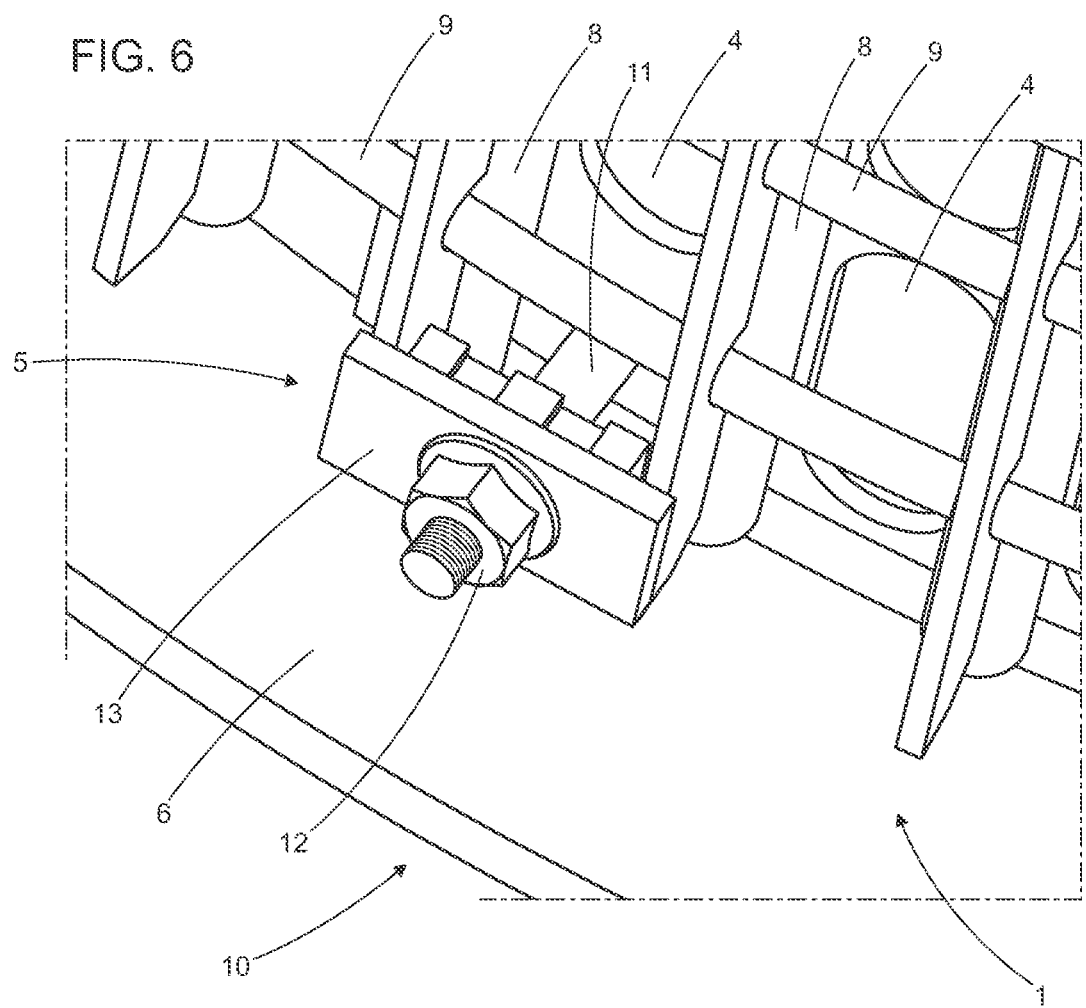

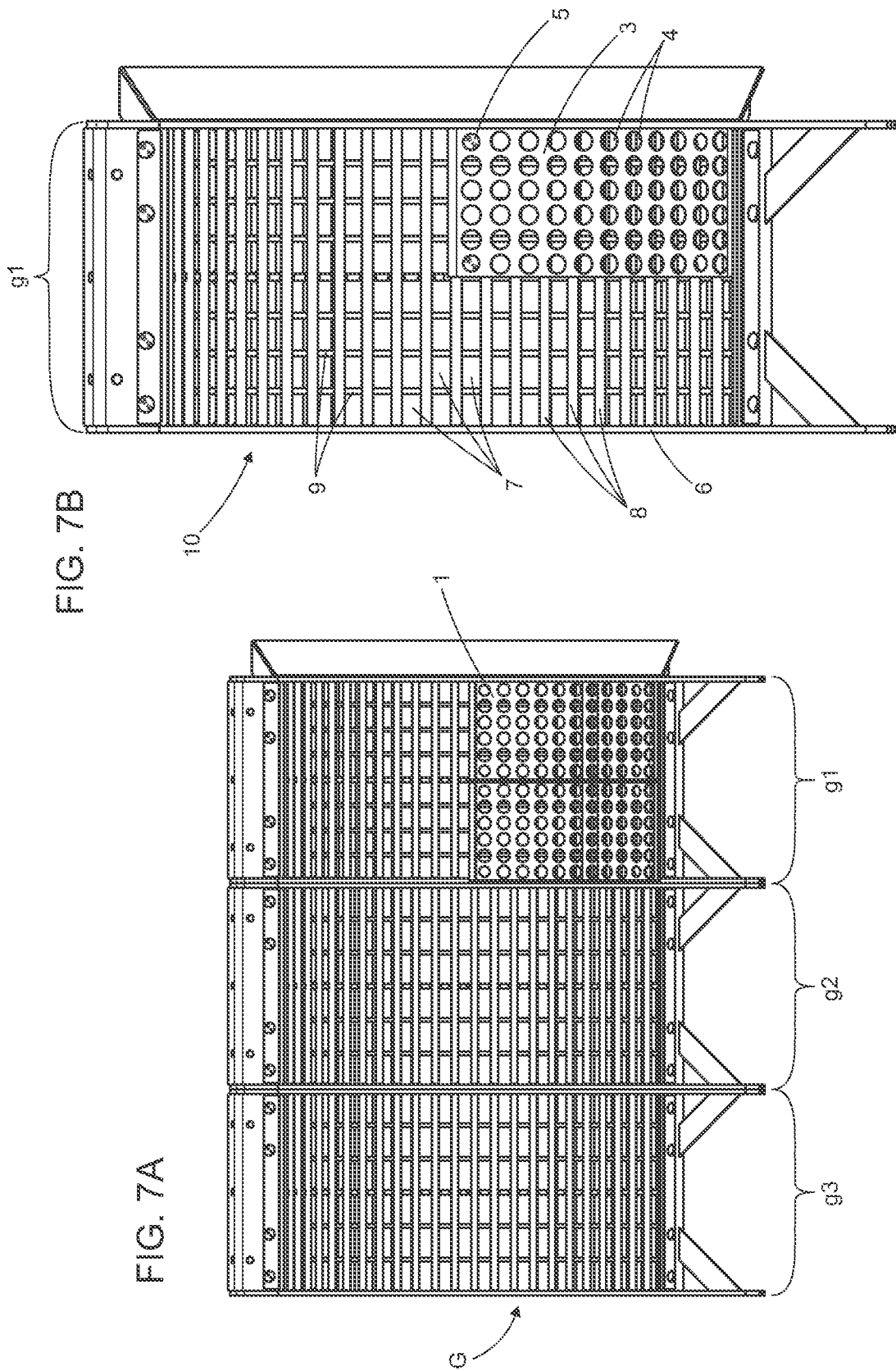

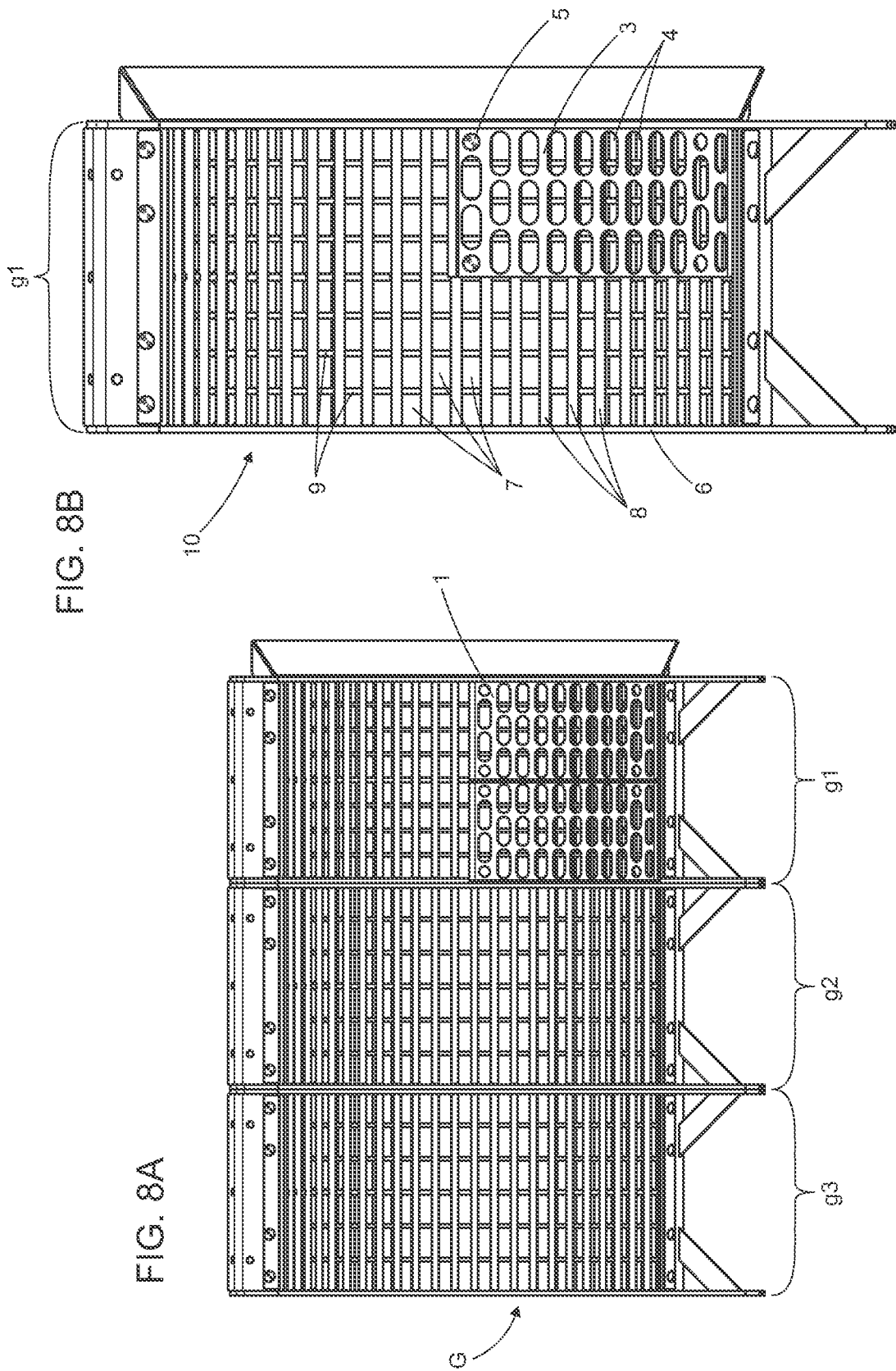

PERFORATED COVERS FOR THRESHING CONCAVES

FIELD OF THE INVENTION

The present invention relates to a removable covering plate to apply to threshing modules of agricultural machines, such as combines.

More particularly, said perforated cover plate comprises technical and constructive features specially designed to provide coupling in the concaves of the threshing module, and thus obtaining a more uniform distribution of the grains which are processed by the threshing rotor and directed toward the cleaning system, specially to compensate the crop in sloping grounds.

BACKGROUND OF THE INVENTION

An agricultural vehicle known as a "combine", or a "combine harvester" or "grains harvester", is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed, it falls through perforations in the concaves onto a grain pan. From the grain pan the grain is cleaned using a cleaning system, and is then transported to a grain tank onboard the combine. The cleaning system includes a cleaning fan which blows air through the oscillating sieves to discharge chaff and other debris toward the rear of the combine. Non-grain crop material, or MOG (Material Other than Grain), such as straw, proceeds through the threshing system, which may utilize a straw chopper and direct it out of the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear portion) or transversely within the body of the combine, and which are partially or fully surrounded by a perforated concave. The crop material is threshed and separated by the rotation of the rotor within the concave. Coarser non-grain crop material, such as stalks and leaves, is transported to the rear of the combine and discharged back to the field. The separated grain, together with some finer non-grain crop material such as chaff, dust, straw, and other crop residue are discharged through the concaves and fall onto a grain pan where they are transported into a cleaning system. Alternatively, the grain and finer MOG may also fall directly onto the cleaning system itself.

The cleaning system further separates the grain from the MOG, and typically includes a fan directing an airflow stream upwardly and rearwardly through vertically arranged sieves which oscillate in a fore and aft manner. The airflow stream lifts and carries the lighter MOG towards the rear end of the combine for discharge to the field. Clean grain, being heavier, and larger pieces of MOG, which are not carried away by the airflow stream, fall onto a surface of an upper sieve (also known as a chaffer sieve), where some or all of the clean grain pass through to a lower sieve (also known as a cleaning sieve). Grain and the MOG remaining on the upper and lower sieves are physically separated by the reciprocating action of the sieves as the material moves rearwardly. Any grain and/or MOG remaining on the top surface of the upper sieve are discharged at the rear of the combine. Grain falling through the lower sieve lands on a bottom pan of the cleaning system, where it is conveyed forwardly toward a clean grain auger.

A harvester, as previously disclosed, is widely known in the prior art, such as a harvester commercialized with the brand CASE IH, from CNH Industrial NV.

Particularly, concerning the threshing modules, it is known that it comprises, basically, a threshing rotor and a concave, also known as a concentric cage of the threshing rotor. More particularly, this concentric cage is usually formed by a concaves assembly, forming a static structure in relation to the threshing rotor, which is endowed with a plurality of frictional elements usually defined by projections or ribs distributed on its external side, which are called "rasp bar" or, in Portuguese, "gengivas".

Conventionally, said threshing concaves are formed by a series of parallel and perpendicular bars among each other which cause the definition of multiple retention surfaces and multiple openings in a way that it permits the threshing and the passage of the processed material through the threshing rotor to the cleaning sieves.

For information purposes, it is known that the frictional elements of the threshing rotor are slightly spaced apart from the retention surfaces of the concaves, defining a threshing gap that might be adjusted according to the vegetal cultivation that is being processed. Thus, during the processing of the vegetal crops in the inner face of the threshing module, the rough vegetal structures (grains and/or seeds encapsulated in skins and/or housings) are directed to the aforementioned threshing gap and, consequently, submitted to the friction imposed by the threshing rotor and the concave, which cooperate between them, causing the grains and/or seeds separation from the skins and/or housings. To this end, in order to change the distance between the concaves and the rotor rasp bars, in order to adapt the threshing to different grains sizes, the combines, usually, have a concaves adjusting system.

Despite of the fact that the combines known in the prior art are able to execute their activities effectively and, each day, demonstrate advances regarding the increase in the yields and productivity, a few inconveniences have been noted when the crop is occurring in uneven grounds, mainly, sloped grounds. The problems are aggravated when the agricultural machine is of the axial-flow type, in which the threshing rotor is positioned in the center of the machine and placed longitudinally in relation to the front of the machine.

In these cases, as it might be appreciated by the persons skilled in the art, the flow matter enters through the frontal portion of the combine and it is then forwarded towards the threshing module, which is in a rotation movement inside the concentric cage processing the crop material. Under these conditions, due to the rotation movement of the threshing rotor, naturally, the first quadrant of the concentric cage results in an increased amount of collected grains, once they are placed in the first portion where the material is processed As an example for this prior art inconvenient, FIGS. 1A and 1B disclose, in a schematic way, respectively, an axial-flow agricultural machine and said condition of uneven distribution of processed grains through the threshing module. As it is possible to verify, due to the rotation direction, there is a tendency for a larger amount of grains to be accumulated in the side to which the threshing rotor is rotating. Thus, upon observing the agricultural equipment from the front, in case the threshing rotor is moving in a clockwise direction, the grains accumulate to the left side, however, in case the rotor is moving in a counter-clockwise direction, the grains accumulate to the right side of the equipment.

It is known that, despite of the fact that the most modern agricultural machines having high embedded technology comprise mechanisms to compensate possible ground unevennesses during the crop, such mechanisms have certain compensation limits and, depending on the ground, might not be sufficient to avoid the grains to accumulate in on side of the machine and, as a result, part of the processed material is likely to fall from the equipment or not being properly cleaned, causing a decrease in productivity and in the crop yields.

This irregular distribution of the processed material by the threshing module of the agricultural machines might be even more problematic when the ground slope favors accumulation of processed grains exactly on the side in which the first portion of the concentric cage receives the highest amount of processed material. As it might be appreciated by the persons skilled in the art, this condition compromises the yields and productivity of the crop, since none of the known compensation mechanisms will be efficient in order to avoid the material waste during the displacement and work performed on the sloped ground. Furthermore, depending on the conditions, such material accumulated on one side might damage the agricultural machine and, consequently, cause losses due to the necessity to stop work and provide maintenance.

Thus, regarding the aforementioned information, it is noted that the agricultural equipment in the prior art, commonly used for grains crop, such as the called combines, which are capable of adapting to different vegetable cultures, lack of practical and functional solutions that are able to effectively promote a more uniform distribution of the processed grains by the threshing module.

In a more objective way, it is verified that the agricultural machines for grains crop known in the prior art comprise relatively complex mechanisms and systems in order to try to obtain the compensation of the ground slope, nevertheless, depending on the crop conditions, they are not able to solve the inconveniences of grains unevenly accumulated.

DESCRIPTION OF THE INVENTION

Therefore, considering the above-mentioned disclosed, it is one of the aims of the present invention to provide a perforated cover plate to be used in the threshing module of agricultural machines, specially, for grains harvesters, being projected and developed to solve, in a simple, practical and, mainly, functional way the problems, inconveniences and limitations revealed by the agricultural sets of equipment known in the prior art.

More specifically, it is one of the aims of the present invention to provide a perforated cover plate to be applied to at least one of the concaves that form the concentric cage of the threshing rotor. Particularly, said plate is applied to the initial concaves, in a way that it provides a more homogeneous distribution of the processed grains by the threshing module.

Another aim of the present invention is to provide a removable cover plate to be applied to at least one of the concaves of the concentric cage, particularly in the first quadrants, in a way that it forms a more restricted area for the passage of the grains and, thus, allowing the grains to be better distributed, and in a more homogeneous way, throughout the whole structure of the concentric cage and the cleaning sieves and, thus, avoiding the grains to accumulate in a certain region, or side, of the agricultural equipment.

It is also an aim of the present invention to provide a cover plate to at least one of the concaves of the threshing module, which, acting in combination with other compensation systems and mechanisms of the agricultural equipment, is able to increase the harvester capacity on grounds with higher slope, reducing losses.

Additionally, the present invention relates to an agricultural machine of grains harvester type or alike, which comprises a threshing module in which at least one of the concaves of the concentric cage of the threshing rotor is able to receive a cover plate in order to provide the restriction of the processed grains passage and, thus, providing a more uniform distribution throughout the concentric cage.

Thus, based on what is previously disclosed, and aiming to achieve the objectives and technical and functional effects above indicated, amongst others, the present invention relates to a removable cover plate to be applied to at least one concave of a threshing module of a combine, being said threshing module formed by at least um rotor and at least a mounted concave at least, partially, surrounding the rotor. Referred removable cover plate comprises a removable structure that has a matter retention surface, in which are provided openings that facilitate certain restriction to the grains and/or MOG passage.

According to an embodiment, according to the present invention, the removable cover plate has, additionally, one or more openings to receive means of fixation responsible for its fixation and installation in a frame of at least part of the concave of said threshing module. According to an embodiment preferably advantageous of the present invention, the removable cover plate is attached and installed in the frame of the concave which comprises the first quadrant of the first section of the concave.

Additionally, according to possible and preferred embodiments of the removable cover plate, object matter of the present invention, said openings which provide the restriction of the grains and/or MOG passage may comprise distinct shapes and dimensions, for instance, circular, oblong, oval, rectangular, triangular, including a combination of such configurations.

In addition, according to an embodiment of the present invention, said means of the removable cover plate fixation might be installed using bolts, nuts and small locking blocks. Alternatively, said assembly might be substituted by clips applied between the plate and said structure of the concave.

According to an alternative embodiment of the present invention, said removable cover plate may be attached and installed to part of the first quadrant of the first section of the threshing module. Optionally, according to other possible variations of the present invention, said removable cover plate might be fixed and installed in other quadrants and other sections of the threshing module (D).

Furthermore, in another advantageous embodiment of the present invention, said material retention surface might represent about 35% of the total surface of said removable cover plate and, preferably, it is capable of obtaining a restriction between 20% and 45% of the defined area by expected spaces by said concave.

The present invention also comprises an agricultural combine that has, internally, a threshing module formed by at least one threshing rotor placed inside a concentric cage, which comprises at least one concave, on which a removable cover plate is attached and installed according to the present invention. More preferably, said agricultural combine, object matter of the present invention, is an axial-flow combine.

BRIEF DESCRIPTION OF THE DRAWINGS

The above-mentioned and other features and advantages of this invention, as previously indicated, will be better understood by a person skilled in the art from the following detailed description, merely prepared for exemplificative purposes, and not limitative, of preferable embodiments and, with reference to the accompanying schematic drawings, wherein:

FIG. 5 is a side view of the concave section as shown in FIG. 4, with the cover plate according to the present invention properly installed;

FIG. 6 is an embodiment of a possible cover plate fixation manner, object of the present invention, to the concave of a threshing module; and FIGS. 7A and 7B show side views of the cover plate mounting shown in FIG. 2 in the first quadrant of the concentric cage of the threshing rotor of an agricultural machine, according to the present invention; and FIGS. 8A and 8B show side views of the cover plate mounting shown in FIG. 3 in the first quadrant of the concentric cage of the threshing rotor of an agricultural machine, according to the present invention.

DESCRIPTION OF THE INVENTION EMBODIMENTS

Figure 1A:
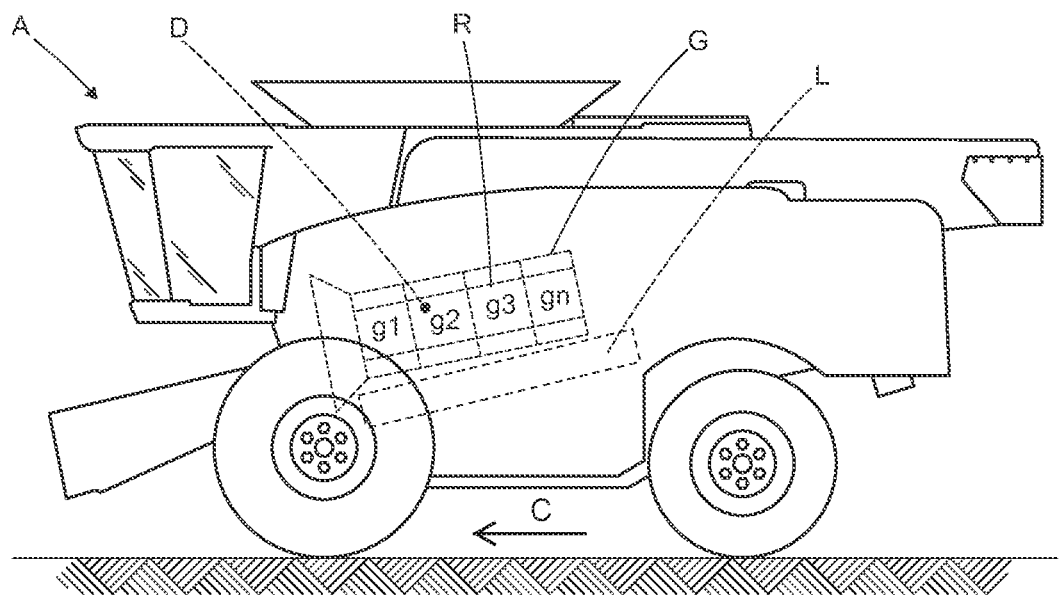
FIG. 1A is a schematic representation of an axial-flow grain harvester, identifying the position of the threshing module in its center, as well as the cleaning system for receiving grains.

Firstly, for illustrative purposes, and for a better comprehension of the matter, according to the present invention, as it might be appreciated by the persons skilled in the art, FIG. 1A shows an agricultural machine (A) of combine type that comprises internally a threshing module (D), which is formed, basically, by a threshing rotor (R) placed inside a concentric cage (G), in a way to provide conditions for the harvested vegetal material to be processed and threshed through the interaction of said threshing rotor (R) and the concaves of said concentric cage (G), which is usually formed by a sequence of sections (g1, g2, g3, gn) formed by the disposition of a series of concaves 10. The harvester moves towards crop C, as indicated by the arrow in FIG. 1A. According to the present specification, the terms herein at some point used such as: above, below, upper, lower, side, right, left, front, rear and their variations must be interpreted according to orientation given in FIG. 1. Furthermore, the indicated reference numbers in the figures are repeated throughout the different views in order to indicate the equal or similar techniques.

Under said threshing module (D) it is contemplated a cleaning and grain harvesting system (L), which is responsible, basically, for receiving and collecting the grains and MOG that fall from the threshing module to clean them, separate them and storing the clean grains for further trans-shipment, as previously disclosed. Also, as previously mentioned a combine of axial type might be obtained from CNH Industrial NV under trademark CASE IH.

Figure 1B:
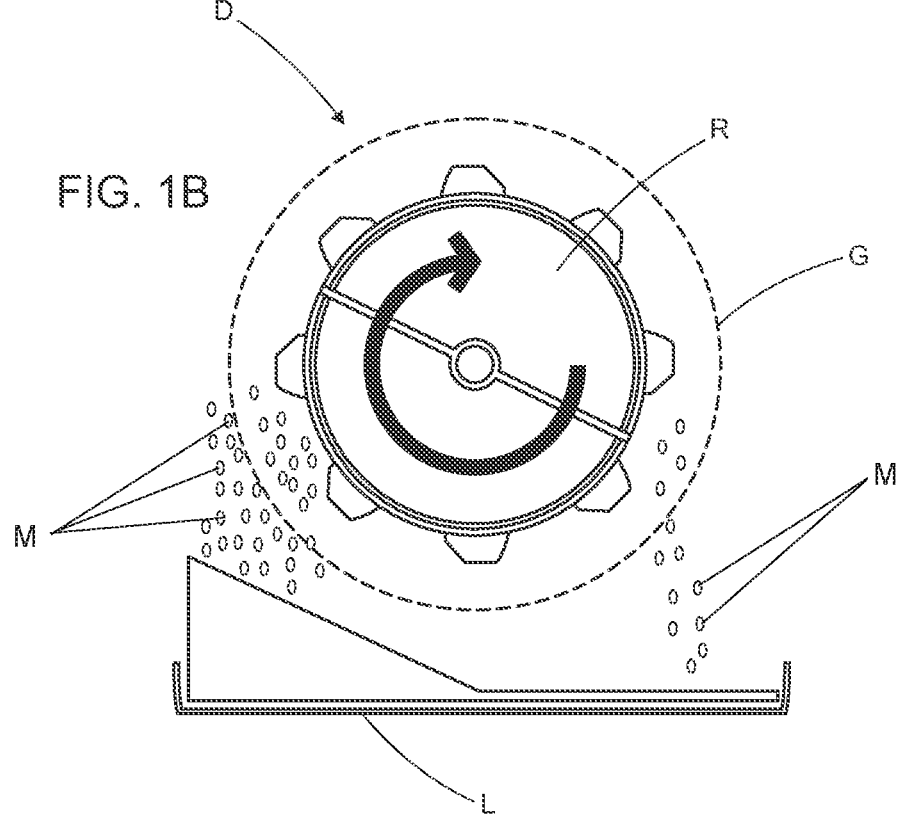
FIG. 1B is a front view of the threshing module of the agricultural machine shown in FIG. 1A, according to the prior art.

FIG. 1B is a schematic representation of said threshing module (D) functioning according to conditions known in the prior art. As it is possible to notice, considering that the threshing rotor (R) is moving in a clockwise direction, as indicated by the arrow in the figure, naturally, the grains and MOG (M) that enter the rotor as the harvester moves, causes the grains to accumulate to the left side of the cleaning and harvesting system (L), since it is exactly in the rotor entrance where the highest amounts of grains and MOG are concentrated. Consequently, the harvest yield might suffer losses, in case the ground is very sloped, specially if the inclination is consistent with the concentration side, according to the left side of the image shown in FIG. 1B.

Thus, based on the brief context above-mentioned, and according to what is shown in the accompanying figures, a cover plate 1 is suggested to at least one concave 10 of the concentric cage of the threshing module of a grains harvester. According to the present invention, the plate is comprised by a structure 2 equipped with a material retention surface 3, in which is contemplated a plurality of holes 4 for the limited passage of grains, being such structured equipped with fixation openings 5 to be installed in frame 6 of the concave 10, preferably, in the frame of the concave corresponding to the first quadrant of the first section (g1) of the concentric cage (G) of the threshing rotor (R).

Figures 2, 3, 4:
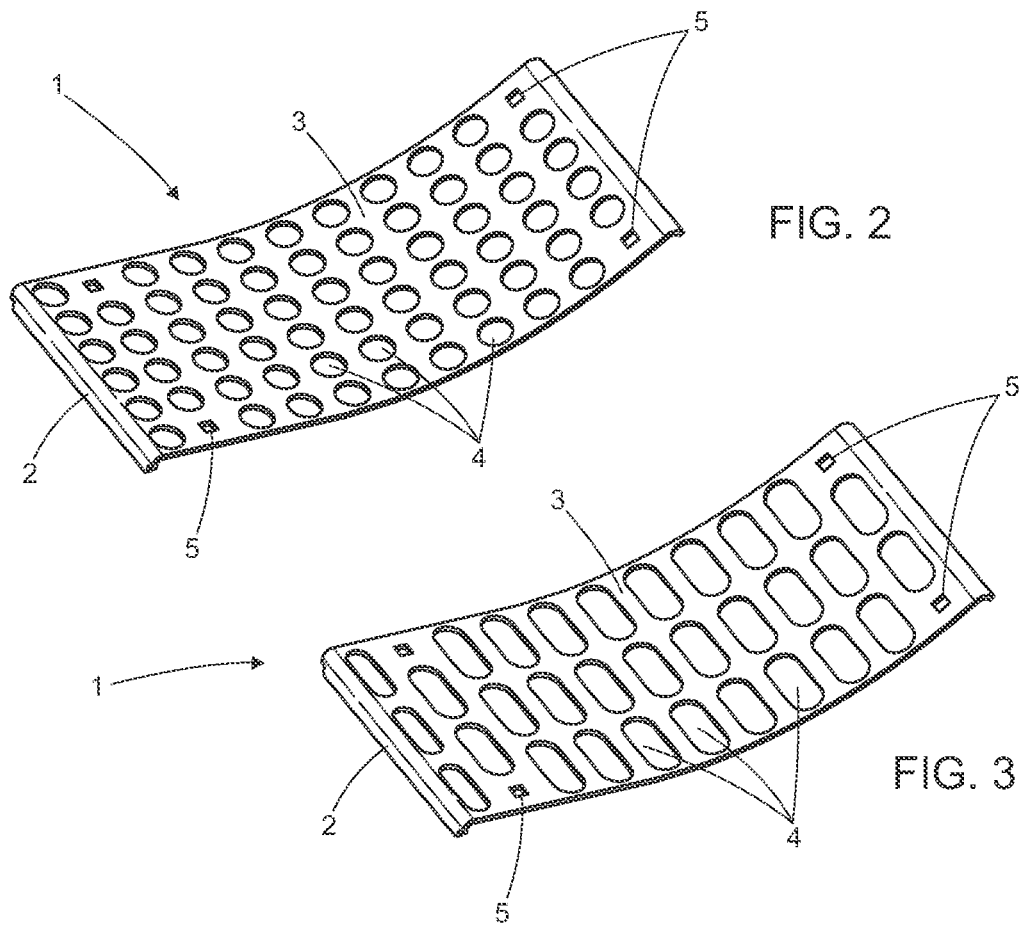
FIG. 2 is an isometric view of an embodiment of the cover plate for concaves, according to the present invention.
FIG. 3 is an isometric view of another embodiment of the cover plate for concaves, according to the present invention.
FIG. 4 is an isometric view of a concave to which the cover plate, object matter of the present invention, can be installed.

According to possible configurative variations of the cover plate 1, object matter of the present invention, said holes 4 comprise shapes and dimensions that vary according to the kind of crop and, at some point, with the grain type that is being processed through the threshing module of the agricultural machine (A). In this sense, said holes may comprise a circular, oblong, oval, rectangular, triangular shape, amongst others, including a combination, at some point, of distinct shapes. According to preferred embodiments of the present invention, said holes 4 comprise a circular or oblong shape, as shown in accompanying FIGS. 2 and 3. As can be seen the shapes of holes 4 differ from a shape of the spaces 7 in concave 10 shown in FIG. 4, this difference can also be clearly seen in FIG. 6.

In this context, it is relevant to highlight that the cover plate 1 installation in frame 6 of at least a concave 10 enables to restrict the spaces 7 between the rods 8 and the longitudinal members 9 responsible for adjusting the frame 6 of said concave 10 and, thus, limiting the grains passage in the section where said cover plate 1 is installed. As a result, upon limiting the passage of the grains, for instance, in the first quadrant of the first section (g1), said threshing rotor (R) is able to drag a higher amount of material and grains into the other quadrants and sections (g2, g3, gn) of the concentric cage (G) of the threshing module (D) and, consequently, provide a more uniform and homogeneous distribution of the grains onto the cleaning and harvesting system (L).

FIG. 5 shows a side view of the concave 10 with the cover plate 1, object matter of the present invention, properly installed and attached through fixation openings 5 on the rods 8 contemplated in frame 6 of said concave 10. As can be seen in FIG. 5, cover plate 1 is in contact with rods 8 and is thereby supported by rods 8 of concave 10. It can also be seen that rods 8 are straight. Further, it can be seen that longitudinal members 9 are not in contact with cover plate 1.

As it might be appreciated by the persons skilled in the art, the fixation openings 5 may be suitable to receive means of fixation that allow said cover plate 1 to remain steady on the rods 8 and the longitudinal members 9 of the frame 6 of the concave 10.

As shown in FIG. 6, a possible embodiment of the fixation mean is formed by a set of bolt 11 and nut 12 with a locking block 13, and this fixation mean eliminates the need to contemplate any anchor pins in frame 6 of the concave 10 and, thus, eliminates any needs for structures adaptation currently available and used in the agricultural machines (A) in the prior art, permitting, thus, an easy and immediate installation and adaptation of the threshing modules (D) which are already being used. Alternatively, a set of bolt 11 and nut 12 with a locking block 13 might be substituted by a clip. The used blocking mean might be any suitable mean to hold the plate 1 secure and attached to concave 10 and the fixation means applied are not relevant to the scope of the present invention.

FIGS. 7A and 7B show configurative variants regarding the installation of the cover plate 1, which holes 4 have circular shapes, according to an embodiment of the present invention. More particularly, in both cases, said cover plate 1 is installed and attached to at least the first quadrant of the first section (g1) of the concentric cage (G). Optionally, depending on the vegetal crop and the processed grains through the threshing module (D), said cover plate 1 might be installed in only a part of the first quadrant of the first section (g1), as shown in FIG. 7B, which shows said first section (g1) of the concentric cage (G).

FIGS. 8A and 8B show configurative variants regarding the installation of the cover plate 1, which holes 4 have an oblong shape, according to one of the preferred embodiments of the present invention. More specifically, in both configurations, said cover plate 1 is installed and attached to at least the first quadrant of the first section (g1) of the concentric cage (G). In an alternative configuration, depending on the vegetal crop and the processed grains through the threshing module (D), said cover plate 1 might be installed in only a part of the first quadrant of the first section (g1), as shown in FIG. 8B which shows said first section (g1) of the concentric cage (G).

As it is possible to observe in FIGS. 7A, 7B, 8A, 8B, the cover plate 1, according to the present invention, provides a restriction to the spaces 7 contemplated in the concave 10 and, thus, limits the total area through where the grains may pass after the rotor threshing (R).

According to embodiments of the present invention, said material retention surface 3 might represent about 30% of the total surface of said cover plate 1, such as a restriction which comprises between 20% and 45% of the area formed by spaces 7 contemplated between the bars 8 and the conventional concave 10. Particularly, according to embodiments herein disclosed, the plate of oblong holes (FIGS. 8A and 8B) reduces the free area between the concave bars in 24%, whilst the flat plate with circular holes (FIGS. 7A and 7B) reduces the free area between the concave bars in 43%.

Clearly, as it might be appreciated by the persons skilled in the art, other quadrants and other sections of the concentric cage (G) might receive the cover plates 1, according to the present invention. For instance, in cases in which, for some reason, it is desired for the processed material to be kept longer inside the threshing module, in these cases, it is possible to provide more plates onto more sections (g) of the cage (G).

Thus, considering the technical, constructive and functional aspects of the covers 1 above highlighted, it becomes possible to confirm that the present invention is capable of providing a way of restriction carefully designed in order to obtain a uniform and homogeneous distribution of the processed grains through the threshing modules of the agricultural machines, without the need of making any changes to the sets of equipment that are already in use.

Furthermore, the cover plates, according to the present invention, reveal a simple, but highly effective solution, that allows the manufacturers to eliminate possible risks regarding yield or productivity losses during the crops performed on sloped grounds, mainly for providing an adequate distribution of the material through the threshing module of the agricultural machines, specially, those of the axial-flow combines type.

Finally, upon all the above-mentioned disclosed, the present description aims to describe and define in an exemplificative way preferred embodiments of the cover plate for concaves of the threshing modules of agricultural machines. Therefore, as it might be understood by the persons skilled in the art, several constructive modifications and combinations of equivalent elements are possible without, upon it, diverge from the protection scope defined by the accompanying claims.

The invention claimed is:

1. An axial flow grain harvester, comprising:
a threshing module comprising a concave; and
a removable cover plate mounted on top of the concave, the removable cover plate being a removable structure having a material retention surface comprising openings for limiting passage of grains or MOG, and the openings having a shape that differs from a shape of spaces in the concave.

2. The axial flow grain harvester of claim 1, wherein the material retention plate further comprises one or more additional openings to receive fixation devices for installation onto a frame of at least a part of the concave of the threshing module.

3. The axial flow grain harvester of claim 2, wherein the fixation devices are bolts and nuts with locking blocks.

4. The axial flow grain harvester of claim 2, wherein the fixation devices are clips applied between the plate and a structure of the concave.

5. The axial flow grain harvester of claim 1, wherein the openings comprise distinct shapes and dimensions.

6. The axial flow grain harvester of claim 5, wherein the openings are circular, oblong, oval, rectangular, triangular, or a combination thereof.

7. The axial flow grain harvester of claim 1, wherein an area of the material retention surface outside of the openings represents about 35% of a surface area of the material retention surface inclusive of the openings.

8. The axial flow grain harvester of claim 1, wherein the material retention surface covers between 20% and 45% of an area defined by spaces in the concave.

9. An agricultural harvester, which is an axial flow agricultural harvester, comprising:
a threshing module comprising a concentric cage, a concave, and a threshing rotor within the concentric cage; and
a removable cover plate installed on top of the concave, the cover plate being a removable structure having a material retention surface comprising openings for limiting passage of grains or MOG through the concave, and the concave having a plurality of rods positioned to contact the cover plate.

10. The agricultural harvester of claim 9, wherein the harvester is an axial-flow combine.

11. The agricultural harvester of claim 9, wherein the cover plate is attached and installed on a first section of the concave.

12. The agricultural harvester of claim 9, wherein the cover plate is installed in part of a first quadrant of a first section of the concave.

13. The agricultural harvester of claim 9, further comprising at least one additional cover plate, the additional cover plate being installed in one quadrant and the cover plate being installed in another quadrant of the concave, each additional cover plate being a removable structure having a material retention surface comprising openings for limiting passage of grains or MOG through the concave.

14. The agricultural harvester of claim 9, wherein an area of the material retention surface outside of the openings represents about 35% of a surface area of the material retention surface inclusive of the openings.

15. The agricultural harvester of claim 9, wherein the material retention surface covers between 20% and 45% of an area defined by spaces in the concave.

\* \* \* \* \*